United States Patent [19]
Hayashi et al.

[11] Patent Number: 6,054,850
[45] Date of Patent: Apr. 25, 2000

[54] MAGNETIC SENSOR UNIT FOR COMBINING A SPECIFIC MAGNETIC SENSOR WITH A SPECIFIC RECEIVING UNIT

[75] Inventors: Noriaki Hayashi; Hiroshi Sakanoue; Naoki Hiraoka; Yutaka Ohashi, all of Tokyo, Japan

[73] Assignee: Mitsubishi Denki Kabushiki Kaisha, Tokyo, Japan

[21] Appl. No.: 08/927,259

[22] Filed: Sep. 11, 1997

[30] Foreign Application Priority Data

Mar. 4, 1997 [JP] Japan .................................. 9-049286

[51] Int. Cl.[7] ................................ G01P 3/48; G01B 7/14
[52] U.S. Cl. ........................................ 324/174; 324/207.2
[58] Field of Search ........................... 324/207.2, 207.21, 324/207.25, 260, 262, 166, 174, 175, 173; 338/32 R, 32 H

[56] References Cited

U.S. PATENT DOCUMENTS

| 4,994,739 | 2/1991 | Honda et al. | 324/207.2 |
|---|---|---|---|
| 5,488,294 | 1/1996 | Liddell et al. | 324/207.2 |

FOREIGN PATENT DOCUMENTS

| 43-41-890 | 6/1994 | Germany . | |
| 195-23-322 | 1/1997 | Germany . | |
| 7-198736 | 8/1995 | Japan . | |

*Primary Examiner*—Jay Patidar
*Attorney, Agent, or Firm*—Sughrue, Mion, Zinn, Macpeak & Seas, PLLC

[57] ABSTRACT

The invention provides a magnetic sensor which can be easily produced with a correct combination of parts without requiring an operator to pay particular attention. The magnetic sensor includes: a main sensor unit including: an intermediate part, the outer surface of the intermediate part forming a holder receptor, a receiving structure being provided on the holder receptor; a step-shaped seating; a long plate shaped main including a sensor element, a permanent magnet, and an electronic component; and a connector; and a case including: a sleeve in the form of a cylinder with a closed end and an open end, the sleeve having sealing means formed on the open end, the sealing means serving to create a sealed space inside the sleeve in cooperation with the seating, the sealed space serving as a space in which the main part is placed; a holder for holding the holder receptor, the holder including a fitting structure extending from the open end of the sleeve, the fitting structure being fitted to the receiving structure and a separation stopper for preventing the main part from moving off from the sleeve.

7 Claims, 21 Drawing Sheets

MAGNETIC SENSOR UNIT FOR COMBINING A SPECIFIC MAGNETIC SENSOR WITH A SPECIFIC RECEIVING UNIT

BACKGROUND OF THE INVENTION

1. Field of the Invention

The present invention relates to a magnetic sensor for detecting the speed of rotation for example of a gear-shaped magnetic rotor.

2. Description of the Related Art

FIG. 49 is a front view of a conventional magnetic sensor unit. FIG. 50 is a side view of the conventional magnetic sensor taken along line L—L of FIG. 49 wherein a gear-shaped magnetic rotor detected by the magnetic sensor is also shown in the figure. FIG. 51 is a cross-sectional view of a main sensor unit. FIG. 52 is a cross-sectional view of a case. FIG. 53 is a front view of the main sensor unit. FIG. 54 is a front view of the case. In FIGS. 49–53, the magnetic sensor includes: a main sensor unit 1 made up of an electric insulating resin on which an electric component is mounted; and a case 2 made up of an electric insulating resin covering the main sensor unit 1 in a sealed fashion. The main sensor unit 1 includes a main part 1a, a seating 1b, an intermediate part 1c, and a connector 1d. The main part 1a includes a Hall element 3 which is the most important component of the magnetic sensor, a permanent magnet 4, and a circuit board 7 on which a circuit pattern 6 is formed and on which electronic components 5 are mounted.

The intermediate part 1c has a substantially rectangular shape with a small length wherein the seating 1b with the shape of a circular step is formed on one end of the intermediate part 1c such that the axis of the seating 1b is coincident with that of the intermediate part 1c. The end face of the intermediate part 1c is formed into a substantially rectangular shape, and the diameter of the seating 1b is less than the side length of the intermediate part 1c.

The exterior circumferential surface of the seating 1b serves as a fitting-in portion 1e fitted into the case 2 which will be described in detail late. An O-ring groove 1f is formed along the circumference of the fitting-in portion 1e, and an O-ring 9 is disposed in the O-ring groove 1f. When the components are assembled into a complete magnetic sensor, the seating 1b is fitted in an opening at an end of the case 2 so that a closed space is created in the case 2. The main part 1a is disposed on the principal surface of the seating 1b in such a manner that the main part 1a extends in a direction perpendicular to the principal surface of the seating 1b.

The main part 1a is formed into the shape of a substantially rectangular and long plate, and one end of the main part 1a is connected at a right angle to the principal surface of the seating 1b. The circuit board 7 is mounted on one principal surface of the main part 1a. The permanent magnet 4 is mounted at a right angle on the other end of the main part 1a. The Hall element 3 serving as the sensor element for detecting the magnetic material approaching the sensor element is disposed on the outer-side principal surface of the permanent magnet 4.

The connector 1d extends from one side face of the intermediate part 1c. After extending from the end face of the intermediate part 1c in a direction perpendicular to the main part 1a, the connector 1d bends into a direction parallel to the axis of the main part 1a. That is, the connector 1d extends from the end face of the intermediate part 1c into the form of an L-like shape and thus the connector 1d has an offset in position from the central axis of the main sensor unit 1. Terminals electrically connected to the circuit pattern 6 of the main part 1a are embedded in the connector 1d. A connecting cavity is formed in the L-shaped end portion of the connector 1d and the terminals 8 project into the connecting cavity so that a connector of an external device can be fitted into the connecting cavity.

Of four side faces of the intermediate part 1c, the three side faces other than the side face having the connector 1d serve as a holder receptor 1g held by the holder of the case 2.

The main sensor unit 1 is produced by forming the main part 1a, the seating 1b, the intermediate part 1c, and the connector 1d in an integral form including the terminals 8 embedded therein by means of molding. After that, the Hall element 3, the permanent magnet 4, and the circuit board 7 are attached.

The case 2 is produced in an integral fashion by means of molding in such a manner as to include: a sleeve 2a in the form of a cylinder with a closed end; a flange which is formed at an open end of the sleeve 2a by increasing the wall thickness of the end portion of sleeve 2a in outward radial directions; a supporting projection 2c extending outward in a radial direction from the flange 2b; and a holder including three plates 2d extending from the principal surface of the flange 2b in a direction parallel to the sleeve 2a.

The sleeve 2a produced into the form of the cylinder with the closed end has a length similar to that of the main part 1a of the main sensor unit 1, and has a diameter slightly greater than the width of the main part 1a. The main part 1a of the main sensor unit 1 is placed in the sleeve 2a in such a manner that the central axis of the main part 1a is coincident with that of the sleeve. The Hall element 3 disposed on the end of the main part 1a is in contact with the closed end of the sleeve 2a. The sleeve 2a has a receiving portion 2e, inside the sleeve at its open end, for receiving the seating 1b of the main sensor unit 1.

As described earlier, the O-ring 9 is disposed on the seating 1b of the main sensor unit 1. The inner diameter of the receiving portion 2e formed at the open end of the sleeve 2a is slightly greater than the diameter of the seating 1b. The seating 1b is fitted into the sleeve 2a in such a manner that the open end of the sleeve 2a is closed with the seating 1b. The receiving portion 2e is in tight contact with the O-ring 9 and thus serves as sealing means by which a tightly sealed space is created in the case 2. The main part 1a of the main sensor unit 1 is placed in this tightly sealed space.

The flange 2b is formed by increasing the wall thickness of the open end portion of the sleeve 2a outward in radial directions over the entire circumference. The supporting projection 2c extends outward in a radial direction from the flange 2b. A fixing hole 2f is formed in the end portion of the supporting projection 2c in such a manner that the fixing hole 2f extends in parallel to the axis of the sleeve 2a. The magnetic sensor is fixed to a desired location with a screw (not shown) fitted into the fixing hole 2f formed in the supporting projection 2c.

The holder is composed of three plates 2d extending from the principal surface of the flange 2b in the direction parallel to the axis of the sleeve 2a. These three plates 2d are formed so that the principal surface of each plate is in contact with corresponding one of the three side faces, serving as the holder receptor 1g, of the intermediate part 1c of the main sensor unit 1. That is, the three plates 2d are located on the intermediate part 1c in such a manner that the principal surface of each plate 2d is in contact with the holder receptor 1g, while the connector 1d projects through the opening of the holder 2c. Since each principal surface of the holder 2c is in contact with the holder receptor 1g of the intermediate part 1c, the main sensor unit 1 is prevented from rotating relative to the case 2.

The upper end portions 2g of the plates 2d are bent inward into an L shape in cross section along the entire length, by means of high-temperature caulking. The upper end portions 2g of the holder 2c are in contact with the end face of the intermediate part 1c of the main sensor unit 1 so that the upper end portions 2g serve as a separation stopper for preventing the main part 1a from moving outward from the inside of the sleeve 2a.

The magnetic sensor constructed in the above-described manner is fixed to a desired location with a screw fitted through the fixing hole 2f formed in the supporting projection 2c. When a gear-shaped magnetic rotor 20 made up of a magnetic material disposed near the magnetic sensor is rotated, the recessed portions 20a and the protruding portions 20b alternately approach and pass by the Hall element 3. As a result, a variation occurs in the magnetic field which emerges from the permanent magnet 4 and is applied to the Hall element 3. The variation in the magnetic field is detected as a variation in voltage by the Hall element 3. The variation in voltage generated by the Hall element 3 is then converted by the electronic components 5 into a pulse signal. The electric signal in the pulse form is transmitted to an external device (not shown) via the terminals 8 of the connector 1d so as to detect the speed of rotation of the magnetic rotor 20.

In the production process of the magnetic sensor, a resin part of the main sensor unit 1 is first produced by forming the main part 1a, the seating 1b, the intermediate part 1c, and the connector 1d in an integral form including the terminals 8 embedded therein by means of molding. The Hall element 3, the permanent magnet 4, and the circuit board 7 are then mounted on the above resin part. The case 2 is also produced in an integral fashion by means of molding. Then the main sensor unit 1 is inserted into the case 2, and the upper end portions 2g of the plates 2d of the case 2 are caulked at a high temperature so that the main sensor unit 1 and the case 2 are combined together into a completely integral form. The caulking is performed as follows. First, the main sensor unit 1 is inserted into the case 2. Then the assembly is held with a hand at the sleeve 2a or the supporting projection 2c, and a hot tip is put on and pressed against the upper end portions of the holder 2c so that they are bent by means of pressure and heat. In the above caulking process, since the connector 1d is located at an offset location relative to the central axis of the magnetic sensor, it is easy to put the hot tip on the target positions in the rear of the intermediate part 1c.

In the conventional magnetic sensor described above, the main sensor unit 1 and the case 2 each have a wide variety of types which are different in details wherein each type of main sensor unit has one type of case which should be combined with that main sensor unit. An operator should select a main sensor unit and a case which match each other, and combines them into a single form.

Although there are a great number of different types of main sensor units 1 and cases 2, those parts which can be the same in structure, the same structures are employed for convenience of production. In the specific example of the conventional magnetic sensor described above, of various components, the intermediate part 1c and the holder 2c are each constructed into the same structures and are employed in various types of magnetic sensors. However, this creates a chance that a magnetic sensor is produced with a wrong combination of parts.

To avoid the above problem of the wrong combination, a manual or table is prepared so that operators can combine correct parts by referring to the manual or table. However, wrong combination can still occur, and the probability of the wrong combination increases with the number of types of parts. This causes a reduction in production yield.

Thus, it is a general object of the present invention to solve the above problems. More specifically, it is an object of the present invention to provide a magnetic sensor which can be easily produced with a correct combination of parts without requiring an operator to pay particular attention.

SUMMARY OF THE INVENTION

According to an aspect of the present invention, there is provided a magnetic sensor including: a main sensor unit including: an intermediate part in the form of a short rectangular prism, the outer surface of the intermediate part forming a holder receptor, a receiving structure being provided on a part of the holder receptor; a step-shaped seating formed on one end face of the intermediate part; a long plate shaped main part disposed at a right angle on the principal surface of the seating, the main part including: a sensor element disposed on the end of the main part, for detecting the approaching motion of a magnetic member; a permanent magnet disposed adjacent to the sensor element, for generating a magnetic field applied to the sensor element; and an electronic component electrically connected to the sensor element; and a connector extending from the intermediate part, the connector including an terminal for transmitting an output signal of the sensor element to the outside; and a case including: a sleeve in the form of a cylinder with a closed end and an open end, the sleeve having sealing means formed on the open end, the sealing means serving to create a sealed space inside the sleeve in cooperation with the seating, the sealed space serving as a space in which the main part is placed; and a holder for holding the holder receptor, the holder including a fitting structure extending from the open end of the sleeve, the fitting structure being fitted to the receiving structure and a separation stopper for preventing the main part from moving off from the sleeve.

Preferably, the holder is formed in such a manner as to extend from the opening of the sleeve into an outward direction in parallel to the axis of the sleeve so that the holder partially surrounds the intermediate part along its circumference; the holder is made up of a plate whose inner-side surface is in close contact with the holder receptor; the upper end portion of the plate is bent by means of high-temperature caulking so that the bent portion serves as the separation stopper; the fitting structure is formed on the inner-side surface of the plate; and the connector is formed in such a manner as to extend outward through the opening of the plate in a direction perpendicular to the axis of the sleeve.

DESCRIPTION OF THE PREFERRED EMBODIMENTS

First Embodiment

Figure 1:
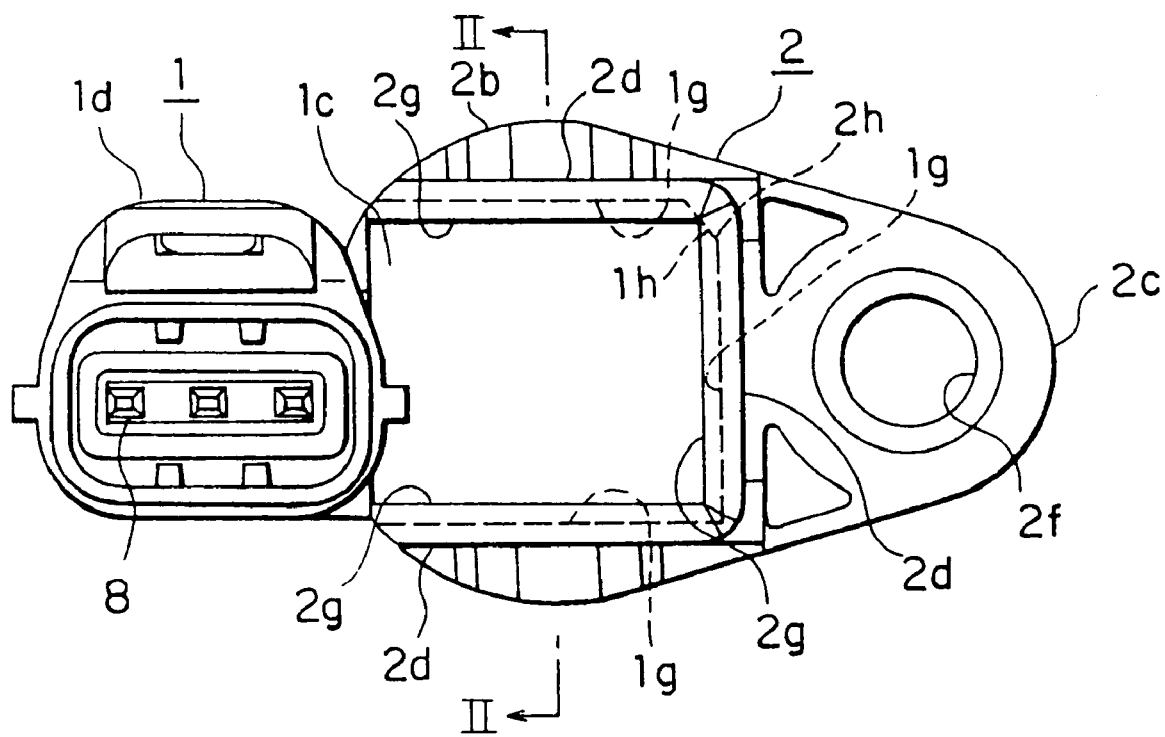
FIG. 1 is a front view of a magnetic sensor according to the present invention.
Figure 2:
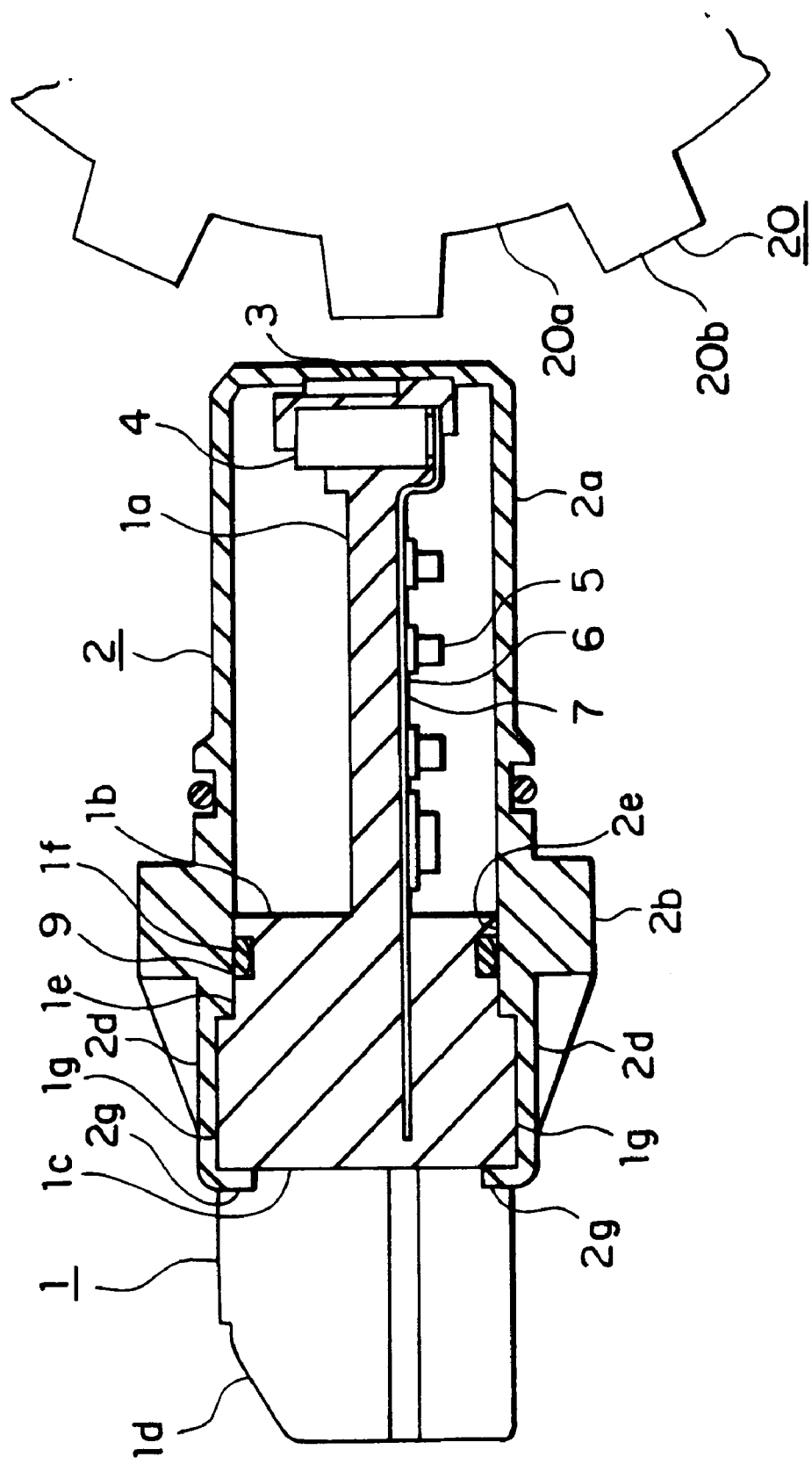
FIG. 2 is a side view of the magnetic sensor taken along line II—II of FIG. 1 wherein a gear-shaped magnetic rotor detected by the magnetic sensor is also shown in the figure.
Figure 3:
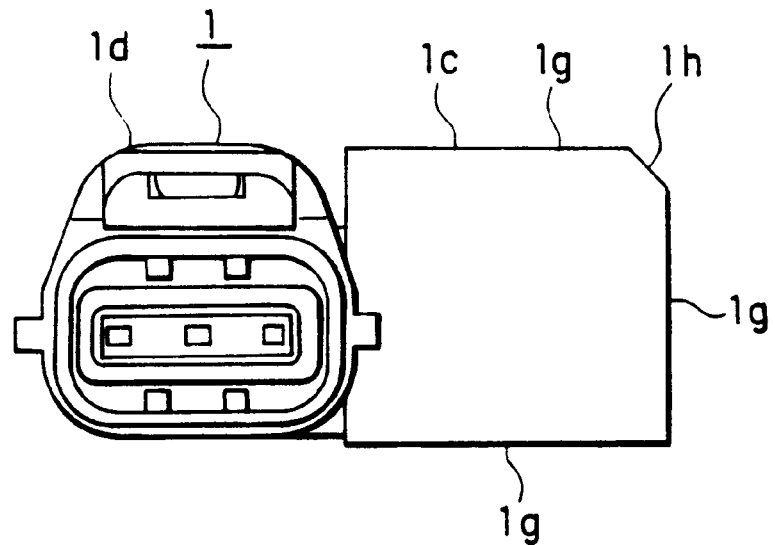
FIG. 3 is a front view of a main sensor unit.
Figure 4:
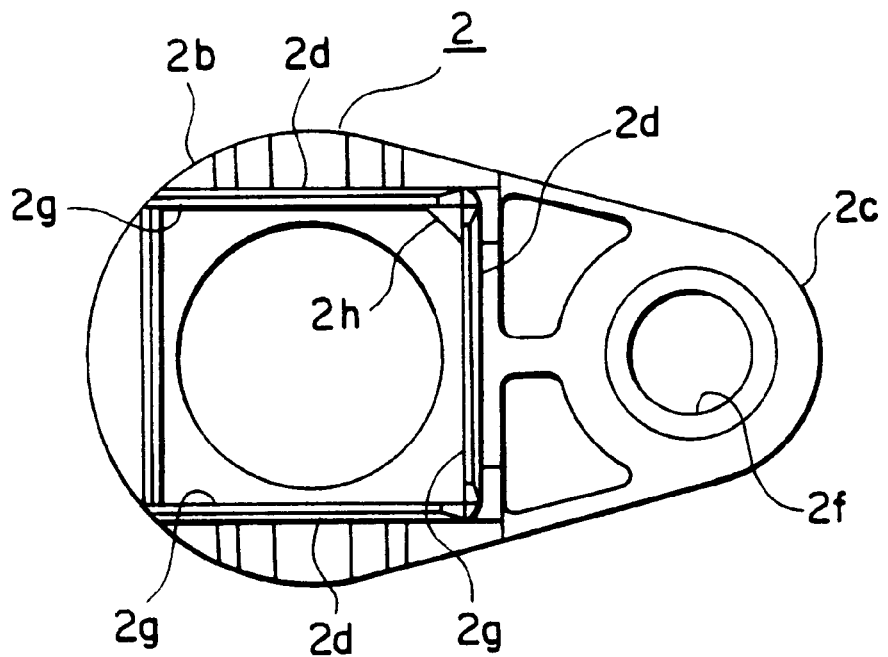
FIG. 4 is a front view of a case.

FIG. 1 is a front view of a magnetic sensor according to the present invention. FIG. 2 is a side view of the magnetic sensor taken along line II—II of FIG. 1 wherein a gear-shaped magnetic rotor detected by the magnetic sensor is also shown in the figure. FIG. 3 is a front view of a main sensor unit. FIG. 4 is a front view of a case. In FIGS. 1–4, the magnetic sensor includes: a main sensor unit 1 made up of an electric insulating resin on which an electric component is mounted; and a case 2 made up of an electric insulating resin covering the main sensor unit 1 in a sealed fashion. The main sensor unit 1 includes a main part 1a, a seating 1b, an intermediate part 1c, and a connector 1d. The main part 1a includes a Hall element 3 which is the most important component of the magnetic sensor, a permanent magnet 4, and a circuit board 7 on which a circuit pattern 6 is formed and on which electronic components 5 are mounted.

The intermediate part 1c has a shape of a substantially rectangular prism with a short length, wherein one edge portion is cut off at 45° along a plane parallel to the axis thereby forming a receiving structure 1h. The receiving structure 1h is formed in such a manner as to closely fit to a fitting structure of the case 2 which will be described later. A seating 1b is formed into a circular step shape on one end surface of the intermediate part 1c in such a manner that the central axes thereof are coincident with each other.

The exterior circumferential surface of the seating 1b serves as a fitting-in portion 1e fitted into the case 2 which will be described in detail later. An O-ring groove 1f is formed along the circumference of the fitting-in portion 1e, and an O-ring 9 is disposed in the O-ring groove 1f. When the components are assembled into a complete magnetic sensor, the seating 1b is fitted in an opening at an end of the case 2 so that a closed space is created in the case 2. The main part 1a is disposed on the principal surface of the seating 1b in such a manner that the main part 1a extends in a direction perpendicular to the principal surface of the seating 1b.

The main part 1a is formed into the shape of a substantially rectangular and long plate, and one end of the main part 1a is connected at a right angle to the principal surface of the seating 1b. The circuit board 7 is mounted on one principal surface of the main part 1a. The permanent magnet 4 is mounted at a right angle on the other end of the main part 1a. The Hall element 3 serving as the sensor element for detecting the magnetic material approaching the sensor element is disposed on the outer-side principal surface of the permanent magnet 4.

The connector 1d extends from one side face of the intermediate part 1c. After extending from the end face of the intermediate part 1c in a direction perpendicular to the main part 1a, the connector 1d bends into a direction parallel to the axis of the main part 1a. That is, the connector 1d extends from the end face of the intermediate part 1c into the form of an L-like shape and thus the connector 1d has an offset in position from the central axis of the main sensor unit 1. Terminals electrically connected to the circuit pattern 6 of the main part 1a are embedded in the connector 1d. A connecting cavity is formed in the L-shaped end portion of the connector 1d and the terminals 8 project into the connecting cavity so that a connector of an external device can be fitted into the connecting cavity.

Of four side faces of the intermediate part 1c, the three side faces other than the side face having the connector 1d serve as a holder receptor 1g held by the holder of the case 2.

The main sensor unit 1 is produced by forming the main part 1a, the seating 1b, the intermediate part 1c, and the connector 1d in an integral form including the terminals 8 embedded therein by means of molding. After that, the Hall element 3, the permanent magnet 4, and the circuit board 7 are attached.

The case 2 is produced in an integral fashion by means of molding in such a manner as to include: a sleeve 2a in the form of a cylinder with a closed end; a flange which is formed at an open end of the sleeve 2a by increasing the wall thickness of the end portion of sleeve 2a in outward radial directions; a supporting projection 2c extending outward in a radial direction from the flange 2b; and a holder including three plates 2d extending from the principal surface of the flange 2b in a direction parallel to the sleeve 2a.

The sleeve 2a produced into the form of the cylinder with the closed end has a length similar to that of the main part 1a of the main sensor unit 1, and has a diameter slightly greater than the width of the main part 1a. The main part 1a of the main sensor unit 1 is placed in the sleeve 2a in such a manner that the central axis of the main part 1a is coincident with that of the sleeve. The Hall element 3 disposed on the end of the main part 1a is in contact with the closed end of the sleeve 2a. The sleeve 2a has a receiving portion 2e, inside the sleeve at its open end, for receiving the seating 1b of the main sensor unit 1.

As described earlier, the O-ring 9 is disposed on the seating 1b of the main sensor unit 1. The inner diameter of the receiving portion 2e formed at the open end of the sleeve 2a is slightly greater than the diameter of the seating 1b. The seating 1b is fitted into the sleeve 2a in such a manner that the open end of the sleeve 2a is closed with the seating 1b. The receiving portion 2e is in tight contact with the O-ring 9 and thus serves as sealing means by which a tightly sealed space is created in the case 2. The main part 1a of the main sensor unit 1 is placed in this tightly sealed space.

The flange 2b is formed by increasing the wall thickness of the open end portion of the sleeve 2a outward in radial directions over the entire circumference. The supporting projection 2c extends outward in a radial direction from the flange 2b. A fixing hole 2f is formed in the end portion of the supporting projection 2c in such a manner that the fixing hole 2f extends in parallel to the axis of the sleeve 2a. The magnetic sensor is fixed to a desired location with a screw (not shown) fitted into the fixing hole 2f formed in the supporting projection 2c.

The holder is composed of three plates 2d extending from the principal surface of the flange 2b in the direction parallel to the axis of the sleeve 2a. These three plates 2d are formed so that the principal surface of each plate is in contact with corresponding one of the three side faces, serving as the holder receptor 1g, of the intermediate part 1c of the main sensor unit 1. That is, the three plates 2d are located on the intermediate part 1c in such a manner that the principal surface of each plate 2d is in contact with the holder receptor 1g, while the connector 1d projects through the opening of the holder 2c. Since each principal surface of the holder 2c is in contact with the holder receptor 1g of the intermediate part 1c, the main sensor unit 1 is prevented from rotating relative to the case 2.

One inner corner line at the boundary between two plates 2d of the three plates 2d described above is partially filled with the same material in such a manner as to form a plane serving as a fitting structure 2h parallel to the axis. The fitting structure 2h is formed in such a manner that it closely fits to the receiving structure 1h formed on the intermediate part 1c of the main sensor unit 1.

The upper end portions 2g of the plates 2d are bent inward into an L shape in cross section along the entire length, by means of high-temperature caulking. The upper end portions 2g of the holder 2c are in contact with the end face of the intermediate part 1c of the main sensor unit 1 so that the upper end portions 2g serve as a separation stopper for preventing the main part 1a from moving outward from the inside of the sleeve 2a.

The magnetic sensor is, as described above, fixed to a desired location with a screw fitted through the fixing hole 2f formed in the supporting projection 2c. When a gear-shaped magnetic rotor 20 made up of a magnetic material disposed near the magnetic sensor is rotated, the recessed portions 20a and the protruding portions 20b alternately approach and pass by the Hall element 3. As a result, a variation occurs in the magnetic field which emerges from the permanent magnet 4 and is applied to the Hall element 3. The variation in the magnetic field is detected as a variation in voltage by the Hall element 3. The variation in voltage generated by the Hall element 3 is then converted by the electronic components 5 into a pulse signal. The electric signal in the pulse form is transmitted to an external device (not shown) via the terminals 8 of the connector 1d so as to detect the speed of rotation of the magnetic rotor 20.

In the production process of the magnetic sensor, a resin part of the main sensor unit 1 is first produced by forming the main part 1a, the seating 1b, the intermediate part 1c, and the connector 1d in an integral form including the terminals 8 embedded therein by means of molding. The Hall element 3, the permanent magnet 4, and the circuit board 7 are then mounted on the above resin part. The case 2 is also produced in an integral fashion by means of molding. After that, the main sensor unit 1 is inserted into the case 2 by sliding the main sensor unit 1 in a direction along the axis in such a manner that the receiving structure 1h of the main sensor unit 1 is fitted to the fitting structure 2h of the case 2. Then the upper end portions 2g of the plates 2d of the case 2 are caulked at a high temperature so that the main sensor unit 1 and the case 2 are combined together into a completely integral form. The caulking is performed as follows. First, the main sensor unit 1 is inserted into the case 2. Then the assembly is held with a hand at the sleeve 2a or the supporting projection 2c, and a hot tip is put on and pressed against the upper end portions of the holder 2c so that they are bent by means of pressure and heat. In the above caulking process, since the connector 1d is located at an offset location relative to the central axis of the magnetic sensor, it is easy to put the hot tip on the target positions in the rear of the intermediate part 1c.

Figure 5:
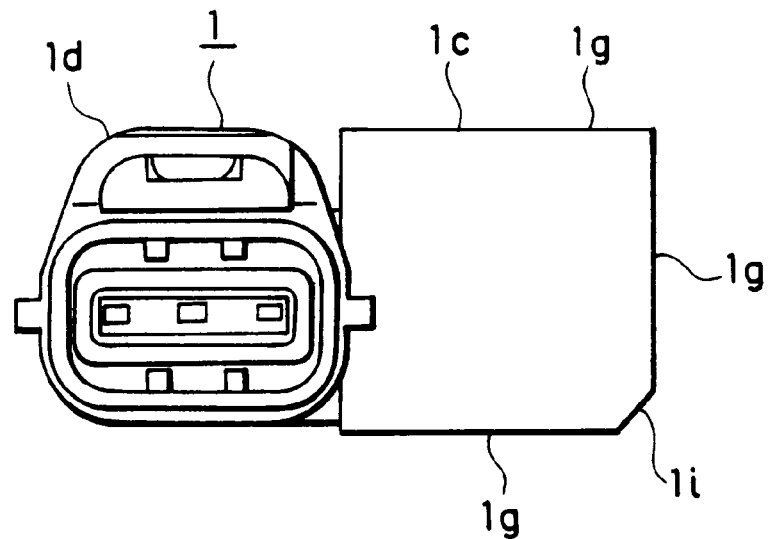
FIG. 5 is a front view of a main sensor unit having another structure, according to the present invention.
Figure 6:
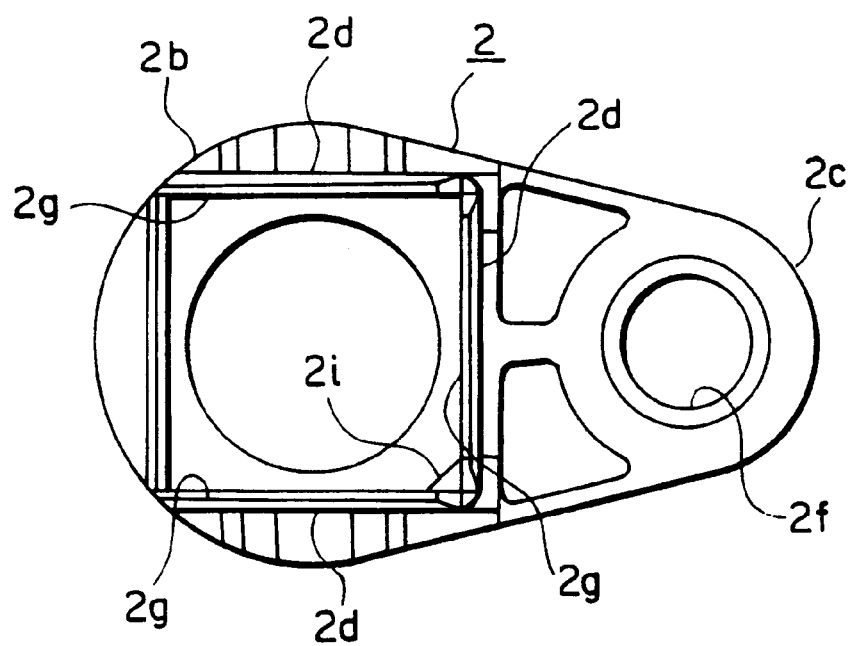
FIG. 6 is a front view of a case designed to match the main sensor unit shown in FIG. 5.
Figure 7:
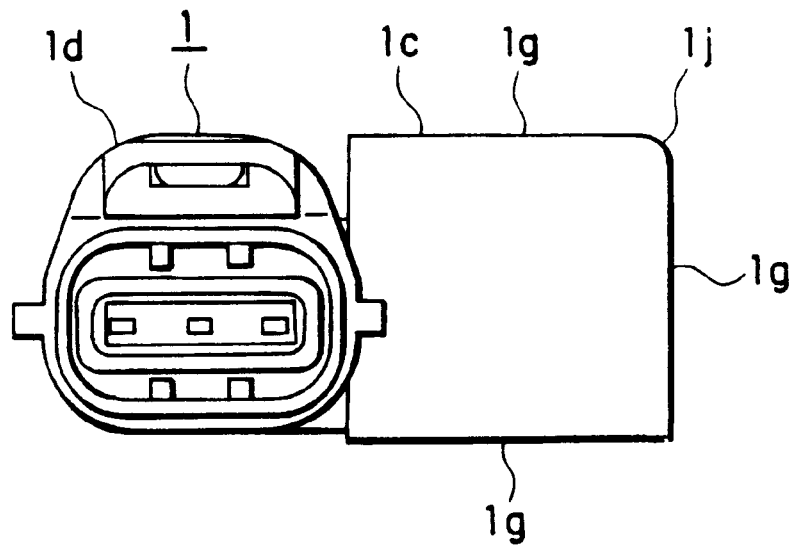
FIG. 7 is a front view of a main sensor unit having still another structure, according to the present invention.
Figure 8:
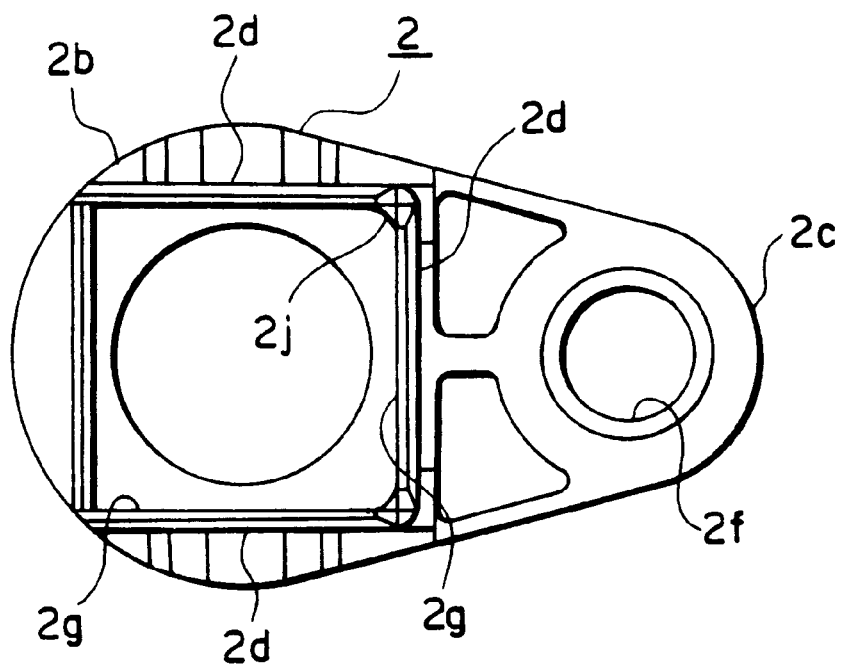
FIG. 8 is a front view of a case designed to match the main sensor unit shown in FIG. 7.
Figure 9:
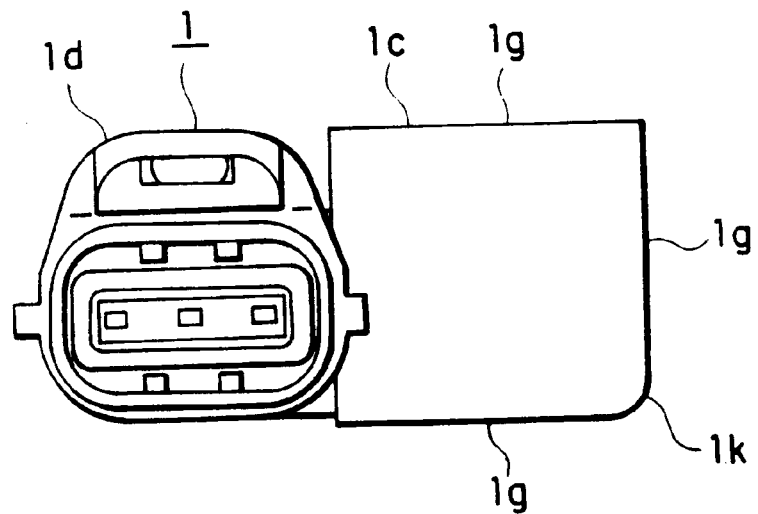
FIG. 9 is a front view of a main sensor unit having still another structure, according to the present invention.
Figure 10:
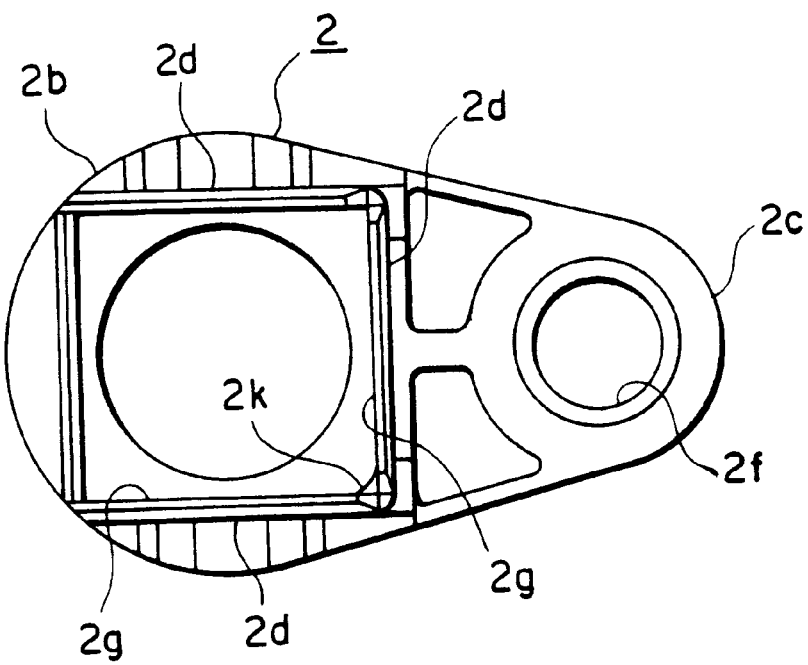
FIG. 10 is a front view of a case designed to match the main sensor unit shown in FIG. 9.
Figure 11:
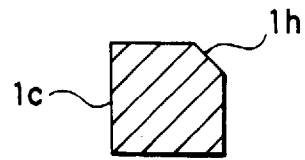
FIG. 11 is a cross-sectional view illustrating an example of the receiving structure of the main sensor unit.
Figure 12:
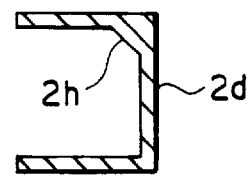
FIG. 12 is a cross-sectional view illustrating the fitting structure of the case designed to match the main sensor unit shown in FIG. 11.
Figure 13:
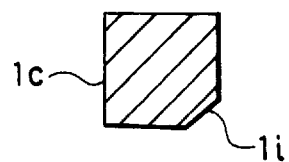
FIG. 13 is a cross-sectional view illustrating another example of the receiving structure of the main sensor unit.
Figure 14:
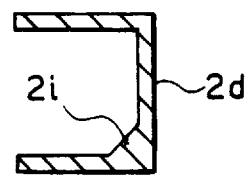
FIG. 14 is a cross-sectional view illustrating the fitting structure of the case designed to match the main sensor unit shown in FIG. 13.

FIG. 5 is a front view of a main sensor unit having a modified structure according to the present embodiment. FIG. 6 is a front view of a case designed to match the main sensor unit shown in FIG. 5. FIG. 7 is a front view of a main sensor unit having another modified structure according to the present embodiment. FIG. 8 is a front view of a case designed to match the main sensor unit shown in FIG. 7. FIG. 9 is a front view of a main sensor unit having still another modified structure according to the present embodiment. FIG. 10 is a front view of a case designed to match the main sensor unit shown in FIG. 9. FIGS. 11–18 are cross-sectional views illustrating the detailed structure of the receiving structures and the fitting structures formed on the main sensor unit and the case employed in the present embodiment and also in the modified embodiments. Of FIGS. 11–18, FIG. 11 illustrates the receiving structure 1h of the main sensor unit shown in FIG. 13 and FIG. 12 illustrates the fitting structure 2h of the case shown in FIG. 4.

In the main sensor unit 1 shown in FIGS. 5 and 13, an edge portion located opposite the receiving structure in FIG. 3 is cut off at 45° along a plane parallel to the axis thereby forming a receiving structure 1i. The case 2 shown in FIGS. 6 and 14 which is combined with the above main sensor unit 1 has a fitting structure 2i formed at a corresponding location so that the fitting structure 2i is closely fitted to the receiving structure 1i.

Figure 15:
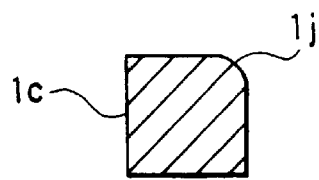
FIG. 15 is a cross-sectional view illustrating still another example of the receiving structure of the main sensor unit.
Figure 16:
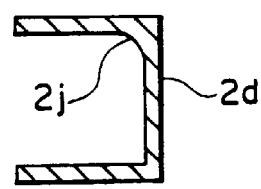
FIG. 16 is a cross-sectional view illustrating the fitting structure of the case designed to match the main sensor unit shown in FIG. 15.
Figure 17:
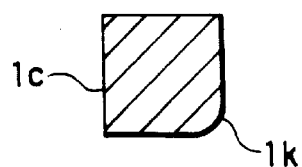
FIG. 17 is a cross-sectional view illustrating still another example of the receiving structure of the main sensor unit.
Figure 18:
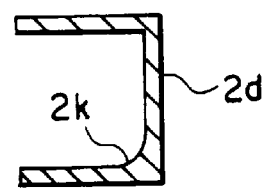
FIG. 18 is a cross-sectional view illustrating the fitting structure of the case designed to match the main sensor unit shown in FIG. 17.

In the main sensor unit 1 shown in FIGS. 7 and 15, one edge portion of the intermediate part 1c is cut off at 45° such that the resultant cut surface is curved into the form of an arc in cross section and such that the cut surface extends in parallel to the axis thereby forming a receiving structure 1j. The case 2 shown in FIGS. 8 and 16 which is combined with the above main sensor unit 1 has a fitting structure 2j formed at a corresponding location so that the fitting structure 2j is closely fitted to the receiving structure 1j. In the main sensor unit 1 shown in FIGS. 9 and 17, an edge portion of the intermediate part 1c, opposite to the receiving structure 1j in FIGS. 7 and 15, is cut off at 45° such that the resultant cut surface is curved into the form of an arc in cross section and such that the cut surface extends in parallel to the axis thereby forming a receiving structure 1k. The case 2 shown in FIGS. 10 and 18 which is combined with the above main sensor unit 1 has a fitting structure 2k formed at a corresponding location so that the fitting structure 2k is closely fitted to the receiving structure 1k.

In the magnetic sensor according to the present embodiment, the receiving structure 2h which is fitted to the fitting structure 1h is formed independently of the receiving portion 2e serving as the sealing means which is in tight contact with the O-ring 9 so as to create a tightly sealed space inside the case 2, wherein the receiving structure 2h is formed at a location which is different from and apart outward from the location of the receiving portion 2e. Furthermore, the upper end portions 2g are bent so that they serve as the separation stopper. Therefore, it is possible to create a tightly sealed space regardless of the structure of the fitting structure 1h and the upper end portions 2g. This means that it is possible to freely design the structure of the fitting structure. For example, the fitting structure can be realized by a recess, projection, or hole formed at a properly selected location. Thus a wide variety of structures are allowed for the fitting structure. Furthermore, the separation stopper may be formed in a simpler fashion for example by means of high-temperature caulking.

In the present embodiment, various types of magnetic sensors are produced by combining various types of main sensor units 1 with various types of cases 2 which match the main sensor units 1 wherein the structure of the receiving structure and the structure of the fitting structure vary from one type magnetic sensor to another. Although it is possible to combine any type of main sensor unit 1 with a corresponding type of case 2 which matches that main sensor unit 1. It is impossible to combine any type of main sensor unit with a case that does not have a corresponding shape. Therefore, operators can easily assemble components into magnetic sensors in a correct fashion without having to pay particular attention.

Second Embodiment

Figure 19:
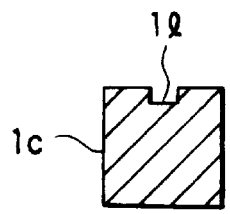
FIG. 19 is a cross-sectional view illustrating another example of the receiving structure of the main sensor unit.
Figure 20:
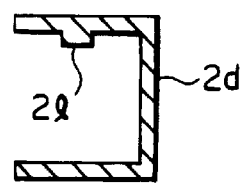
FIG. 20 is a cross-sectional view illustrating the fitting structure of the case designed to match the main sensor unit shown in FIG. 19.
Figure 21:
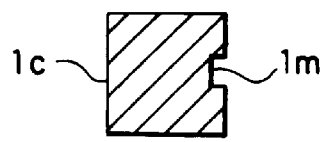
FIG. 21 is a cross-sectional view illustrating another example of the receiving structure of the main sensor unit.
Figure 22:
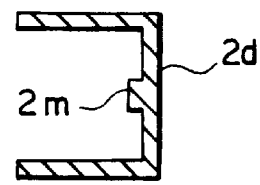
FIG. 22 is a cross-sectional view illustrating the fitting structure of the case designed to match the main sensor unit shown in FIG. 21.
Figure 23:
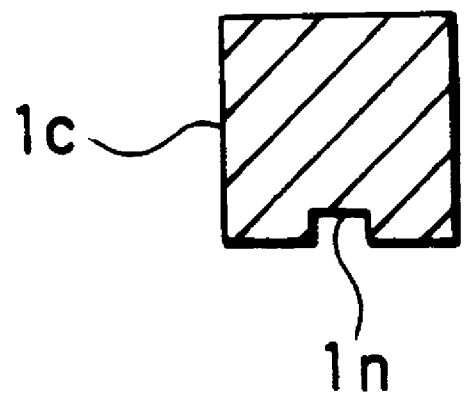
FIG. 23 is a cross-sectional view illustrating another example of the receiving structure of the main sensor unit.
Figure 24:
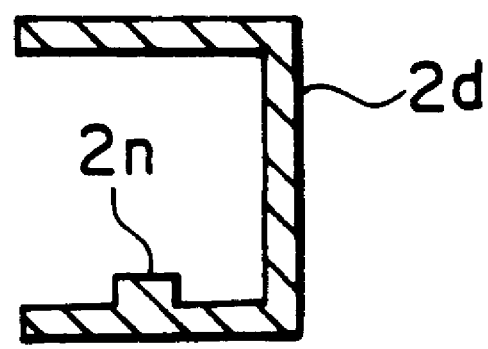
FIG. 24 is a cross-sectional view illustrating the fitting structure of the case designed to match the main sensor unit shown in FIG. 23.

FIG. 19 is a cross-sectional view illustrating another example of the receiving structure formed on the main sensor unit of the magnetic sensor according to the present invention. FIG. 20 is a cross-sectional view illustrating a fitting structure designed to match the receiving structure of the main sensor unit shown in FIG. 19. FIG. 21 is a cross-sectional view illustrating still another example of the receiving structure formed on the main sensor unit of the magnetic sensor according to the present invention. FIG. 22 is a cross-sectional view illustrating a fitting structure designed to match the receiving structure of the main sensor unit shown in FIG. 21. FIG. 23 is a cross-sectional view illustrating still another example of the receiving structure formed on the main sensor unit of the magnetic sensor according to the present invention. FIG. 24 is a cross-sectional view illustrating a fitting structure designed to match the receiving structure of the main sensor unit shown in FIG. 23.

In the case of the main sensor unit 1 shown in FIG. 19, three side faces of the intermediate part 1c other than the side face having the connector 1d serve as a holder receptor 1g held by the holder of the case 2. One of these three side faces has a groove formed in its central portion in a direction parallel to the axis so that the groove serves as a receiving structure 1l. The case 2 shown in FIG. 20 has a protrusion extending in a direction along the axis and serving as a fitting structure 2l formed at a location corresponding to the receiving structure 1l. On the other hand, in the case of the main sensor unit 1 shown in FIG. 21, a groove extending in parallel to the axis and serving as a receiving structure 1m is formed in the central portion of another side face different from that employed in FIG. 19. The case 2 shown in FIG. 22 has a protrusion extending in a direction along the axis and serving as a fitting structure 2m formed at a location corresponding to the receiving structure 1m. In the case of the main sensor unit 1 shown in FIG. 23, a groove extending in parallel to the axis and serving as a receiving structure 1n is formed in the central portion of still another side face. The case 2 shown in FIG. 24 has a protrusion extending in a direction along the axis and serving as a fitting structure 2n formed at a location corresponding to the receiving structure 1n.

In the present embodiment, various types of magnetic sensors are produced by combining various types of main sensor units 1 with various types of cases 2 which match the main sensor units 1 wherein the structure of the receiving structure and the structure of the fitting structure vary from one type magnetic sensor to another. Although it is possible to combine any type of main sensor unit 1 with a corresponding type of case 2 which matches that main sensor unit 1. It is impossible to combine any type of main sensor unit with a case that does not have a corresponding shape. Therefore, operators can easily assemble components into magnetic sensors in a correct fashion without having to pay particular attention.

Third Embodiment

Figure 25:
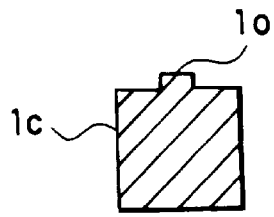
FIG. 25 is a cross-sectional view illustrating another example of the receiving structure of the main sensor unit.
Figure 26:
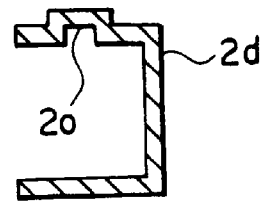
FIG. 26 is a cross-sectional view illustrating the fitting structure of the case designed to match the main sensor unit shown in FIG. 25.
Figure 27:
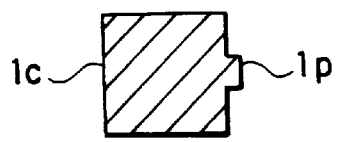
FIG. 27 is a cross-sectional view illustrating another example of the receiving structure of the main sensor unit.
Figure 28:
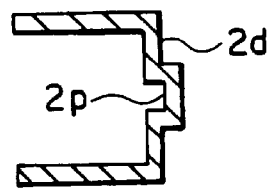
FIG. 28 is a cross-sectional view illustrating the fitting structure of the case designed to match the main sensor unit shown in FIG. 27.
Figure 29:
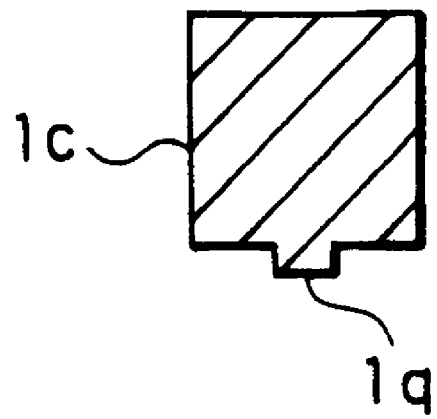
FIG. 29 is a cross-sectional view illustrating another example of the receiving structure of the main sensor unit.
Figure 30:
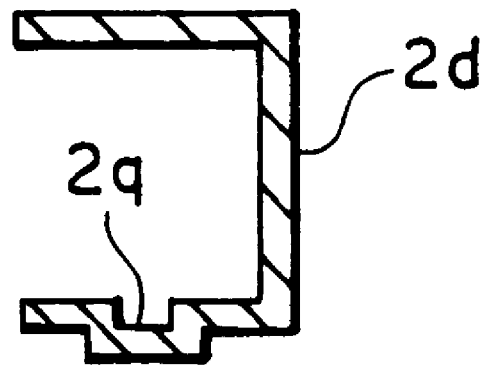
FIG. 30 is a cross-sectional view illustrating the fitting structure of the case designed to match the main sensor unit shown in FIG. 29.

FIG. 25 is a cross-sectional view illustrating another example of the receiving structure formed on the main sensor unit of the magnetic sensor according to the present invention. FIG. 26 is a cross-sectional view illustrating a fitting structure designed to match the receiving structure of the main sensor unit shown in FIG. 25. FIG. 27 is a cross-sectional view illustrating still another example of the receiving structure formed on the main sensor unit of the magnetic sensor according to the present invention. FIG. 28 is a cross-sectional view illustrating a fitting structure designed to match the receiving structure of the main sensor unit shown in FIG. 27. FIG. 29 is a cross-sectional view illustrating still another example of the receiving structure formed on the main sensor unit of the magnetic sensor according to the present invention. FIG. 30 is a cross-sectional view illustrating a fitting structure designed to match the receiving structure of the main sensor unit shown in FIG. 29.

In the case of the main sensor unit 1 shown in FIG. 25, three side faces of the intermediate part 1c other than the side face having the connector 1d serve as a holder receptor 1g held by the holder of the case 2. One of these three side faces has a protrusion formed in its central portion in a direction parallel to the axis so that the protrusion serves as a receiving structure 1o. The case 2 shown in FIG. 26 has a groove extending in a direction along the axis and serving as a fitting structure 2o formed at a location corresponding to the receiving structure 1o. On the other hand, in the case of the main sensor unit 1 shown in FIG. 27, a protrusion extending in parallel to the axis and serving as a receiving structure 1p is formed in the central portion of another side face different from that employed in FIG. 25. The case 2 shown in FIG. 28 has a groove extending in a direction along the axis and serving as a fitting structure 2p formed at a location corresponding to the receiving structure 1p. In the case of the main sensor unit 1 shown in FIG. 29, a protrusion extending in parallel to the axis and serving as a receiving structure 1q is formed in the central portion of still another side face. The case 2 shown in FIG. 30 has a groove extending in a direction along the axis and serving as a fitting structure 2q formed at a location corresponding to the receiving structure 1q.

In the present embodiment, various types of magnetic sensors are produced by combining various types of main sensor units 1 with various types of cases 2 which match the main sensor units 1 wherein the structure of the receiving at structure and the structure of the fitting structure vary from one type magnetic sensor to another. Although it is possible to combine any type of main sensor unit 1 with a corresponding type of case 2 which matches that main sensor unit 1. It is impossible to combine any type of main sensor unit with a case that does not have a corresponding shape. Therefore, operators can easily assemble components into magnetic sensors in a correct fashion without having to pay particular attention.

Fourth Embodiment

Figure 31:
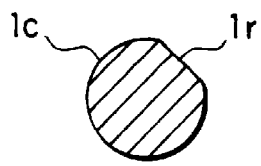
FIG. 31 is a cross-sectional view illustrating another example of the receiving structure of the main sensor unit.
Figure 32:
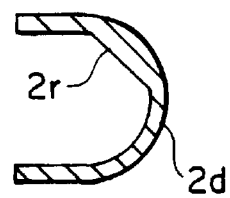
FIG. 32 is a cross-sectional view illustrating the fitting structure of the case designed to match the main sensor unit shown in FIG. 31.
Figure 33:
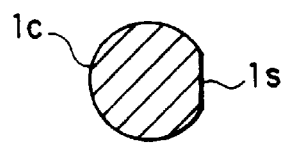
FIG. 33 is a cross-sectional view illustrating another example of the receiving structure of the main sensor unit.
Figure 34:
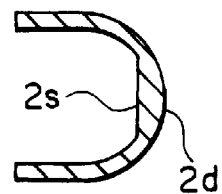
FIG. 34 is a cross-sectional view illustrating the fitting structure of the case designed to match the main sensor unit shown in FIG. 33.
Figure 35:
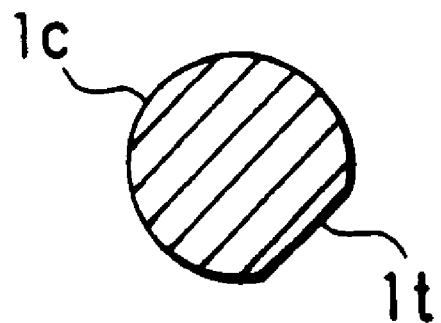
FIG. 35 is a cross-sectional view illustrating another example of the receiving structure of the main sensor unit.
Figure 36:
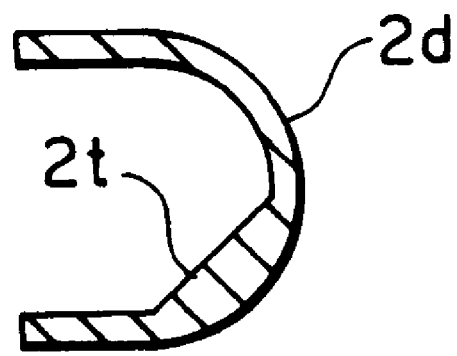
FIG. 36 is a cross-sectional view illustrating the fitting structure of the case designed to match the main sensor unit shown in FIG. 35.

FIG. 31 is a cross-sectional view illustrating another example of the receiving structure formed on the main sensor unit of the magnetic sensor according to the present invention. FIG. 32 is a cross-sectional view illustrating a fitting structure designed to match the receiving structure of the main sensor unit shown in FIG. 31. FIG. 33 is a cross-sectional view illustrating still another example of the receiving structure formed on the main sensor unit of the magnetic sensor according to the present invention. FIG. 34 is a cross-sectional view illustrating a fitting structure designed to match the receiving structure of the main sensor unit shown in FIG. 33. FIG. 35 is a cross-sectional view illustrating still another example of the receiving structure formed on the main sensor unit of the magnetic sensor according to the present invention. FIG. 36 is a cross-sectional view illustrating a fitting structure designed to match the receiving structure of the main sensor unit shown in FIG. 35.

In the case of the main sensor unit 1 shown in FIG. 31, its intermediate part 1c is formed into the shape of a generally circular cylinder with a short length wherein a side face of the intermediate part 1c opposite to the connector 1d (not shown) is formed into the shape of a semi-circle serving as a holder receptor held by the holder of the case 2. The above side face is partially cut off along a plane parallel to the axis thereby forming a receiving structure 1r. The case 2 shown in FIG. 32 has a fitting structure 2r formed at a location corresponding to the receiving structure 1r such that the fitting structure 2r is tightly fitted to the receiving structure 1r. On the other hand, in the case of the main sensor unit 1 shown in FIG. 33, a holder receptor in the shape of a semi-circle in cross section is partially cut off at an angle different from that in FIG. 31 so as to form a receiving structure 1s. The case 2 shown in FIG. 34 has a fitting structure 2s formed at a location corresponding to the receiving structure 1s such that the fitting structure 2s is tightly fitted to the receiving structure 1s. In the case of the main sensor unit 1 shown in FIG. 35, a holder receptor in the shape of a semi-circle in cross section is partially cut off at a still different angle so as to form a receiving structure 1t. The case 2 shown in FIG. 36 has a fitting structure 2t formed at a location corresponding to the receiving structure 1t such that the fitting structure 2t is tightly fitted to the receiving structure 1t.

In the present embodiment, various types of magnetic sensors are produced by combining various types of main sensor units 1 with various types of cases 2 which match the main sensor units 1 wherein the structure of the receiving structure and the structure of the fitting structure vary from one type magnetic sensor to another. Although it is possible to combine any type of main sensor unit 1 with a corresponding type of case 2 which matches that main sensor unit 1. It is impossible to combine any type of main sensor unit with a case that does not have a corresponding shape. Therefore, operators can easily assemble components into magnetic sensors in a correct fashion without having to pay particular attention.

Fifth Embodiment

Figure 37:
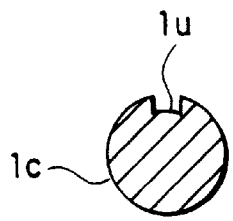
FIG. 37 is a cross-sectional view illustrating another example of the receiving structure of the main sensor unit.
Figure 38:
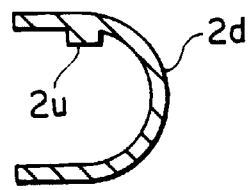
FIG. 38 is a cross-sectional view illustrating the fitting structure of the case designed to match the main sensor unit shown in FIG. 37.
Figure 39:
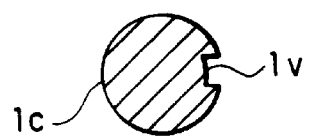
FIG. 39 is a cross-sectional view illustrating another example of the receiving structure of the main sensor unit.
Figure 40:
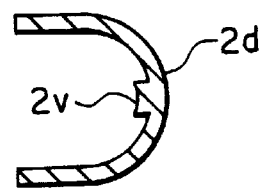
FIG. 40 is a cross-sectional view illustrating the fitting structure of the case designed to match the main sensor unit shown in FIG. 39.
Figure 41:
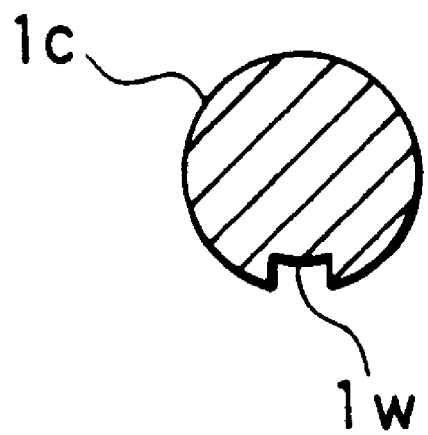
FIG. 41 is a cross-sectional view illustrating another example of the receiving structure of the main sensor unit.
Figure 42:
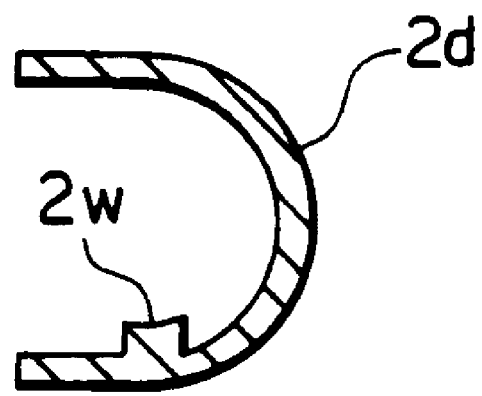
FIG. 42 is a cross-sectional view illustrating the fitting structure of the case designed to match the main sensor unit shown in FIG. 41.

FIG. 37 is a cross-sectional view illustrating another example of the receiving structure formed on the main sensor unit of the magnetic sensor according to the present invention. FIG. 38 is a cross-sectional view illustrating a fitting structure designed to match the receiving structure of the main sensor unit shown in FIG. 37. FIG. 39 is a cross-sectional view illustrating still another example of the receiving structure formed on the main sensor unit of the magnetic sensor according to the present invention. FIG. 40 is a cross-sectional view illustrating a fitting structure designed to match the receiving structure of the main sensor unit shown in FIG. 39. FIG. 41 is a cross-sectional view illustrating still another example of the receiving structure formed on the main sensor unit of the magnetic sensor according to the present invention. FIG. 42 is a cross-sectional view illustrating a fitting structure designed to match the receiving structure of the main sensor unit shown in FIG. 41.

In the case of the main sensor unit 1 shown in FIG. 37, its intermediate part 1c is formed into the shape of a generally circular cylinder with a short length wherein a side face of the intermediate part 1c opposite to the connector 1d (not shown) is formed into the shape of a semi-circle serving as a holder receptor held by the holder of the case 2. The above side face is partially cut so as to form a groove extending in a direction parallel to the axis thereby forming a receiving structure 1u. The case 2 shown in FIG. 38 has a protrusion extending in a direction parallel to the axis and serving as a fitting structure 2u formed at a location corresponding to the receiving structure 1u. On the other hand, in the case of the main sensor unit 1 shown in FIG. 39, a groove serving as a holder receptor 1v is formed on the intermediate part 1c at a location different from that in FIG. 37. The case 2 shown in FIG. 40 has a protrusion serving as a fitting structure 2v formed at a location corresponding to the receiving structure 1v. In the case of the main sensor unit 1 shown in FIG. 41, a groove serving as a holder receptor 1w is formed on the intermediate part 1c at a still different location. The case 2 shown in FIG. 42 has a protrusion serving as a fitting structure 2w formed at a location corresponding to the receiving structure 1w.

In the present embodiment, various types of magnetic sensors are produced by combining various types of main sensor units 1 with various types of cases 2 which match the main sensor units 1 wherein the structure of the receiving structure and the structure of the fitting structure vary from one type magnetic sensor to another. Although it is possible to combine any type of main sensor unit 1 with a corresponding type of case 2 which matches that main sensor unit 1. It is impossible to combine any type of main sensor unit with a case that does not have a corresponding shape. Therefore, operators can easily assemble components into magnetic sensors in a correct fashion without having to pay particular attention.

Sixth Embodiment

Figure 43:
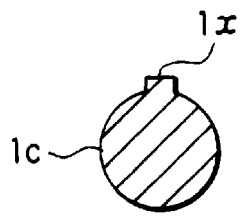
FIG. 43 is a cross-sectional view illustrating another example of the receiving structure of the main sensor unit.
Figure 44:
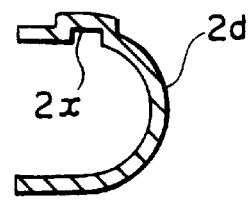
FIG. 44 is a cross-sectional view illustrating the fitting structure of the case designed to match the main sensor unit shown in FIG. 43.
Figure 45:
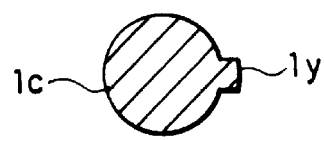
FIG. 45 is a cross-sectional view illustrating another example of the receiving structure of the main sensor unit.
Figure 46:
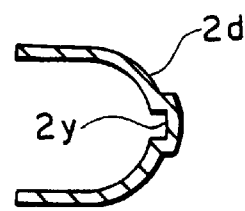
FIG. 46 is a cross-sectional view illustrating the fitting structure of the case designed to match the main sensor unit shown in FIG. 45.
Figure 47:
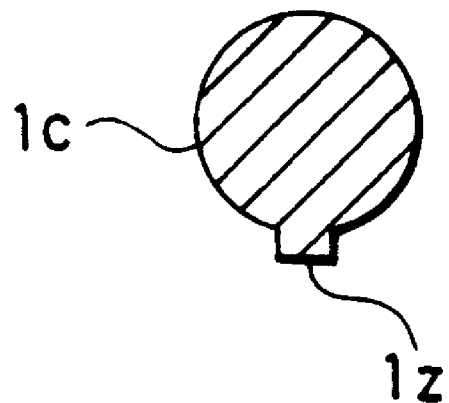
FIG. 47 is a cross-sectional view illustrating another example of the receiving structure of the main sensor unit.
Figure 48:
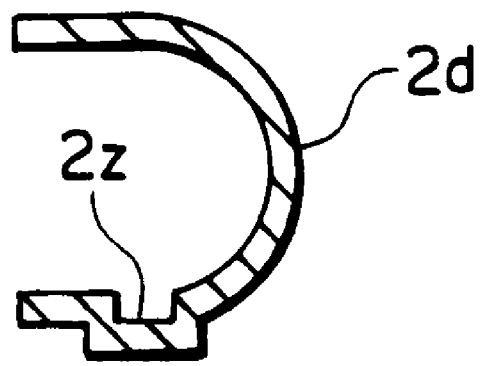
FIG. 48 is a cross-sectional view illustrating the fitting structure of the case designed to match the main sensor unit shown in FIG. 47.
Figure 49:
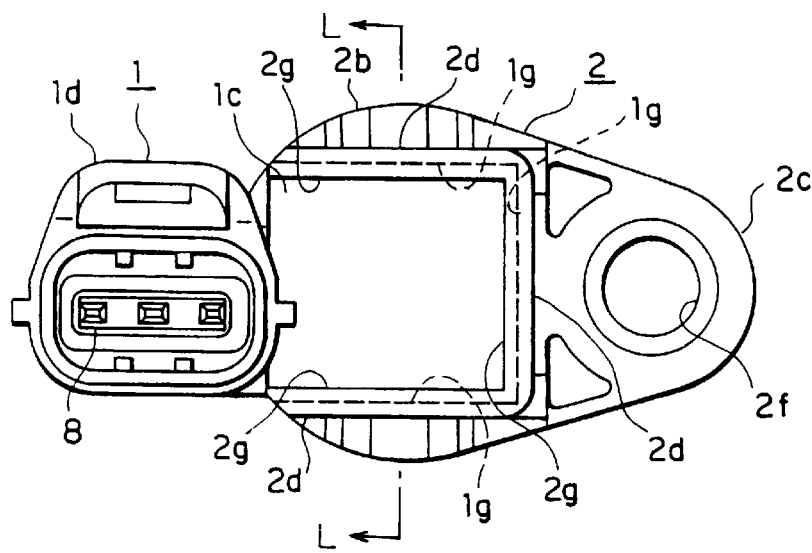
FIG. 49 is a front view of a conventional magnetic sensor.
Figure 50:
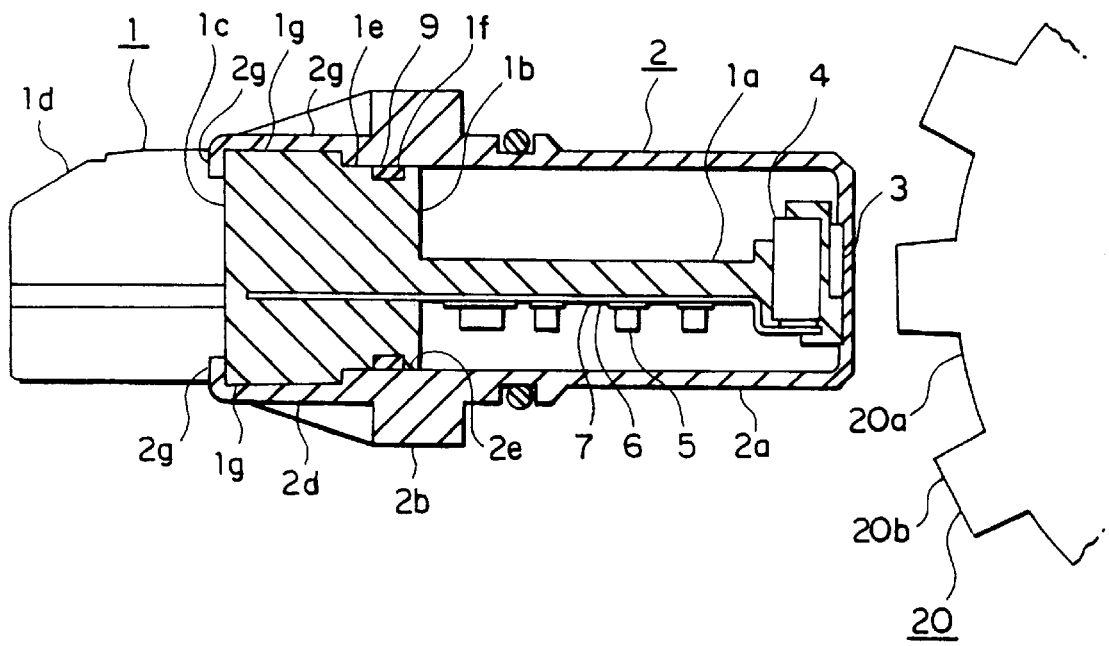
FIG. 50 is a side view of the conventional magnetic sensor taken along line L—L of FIG. 49 wherein a gear-shaped magnetic rotor detected by the magnetic sensor is also shown in the figure.
Figure 51:
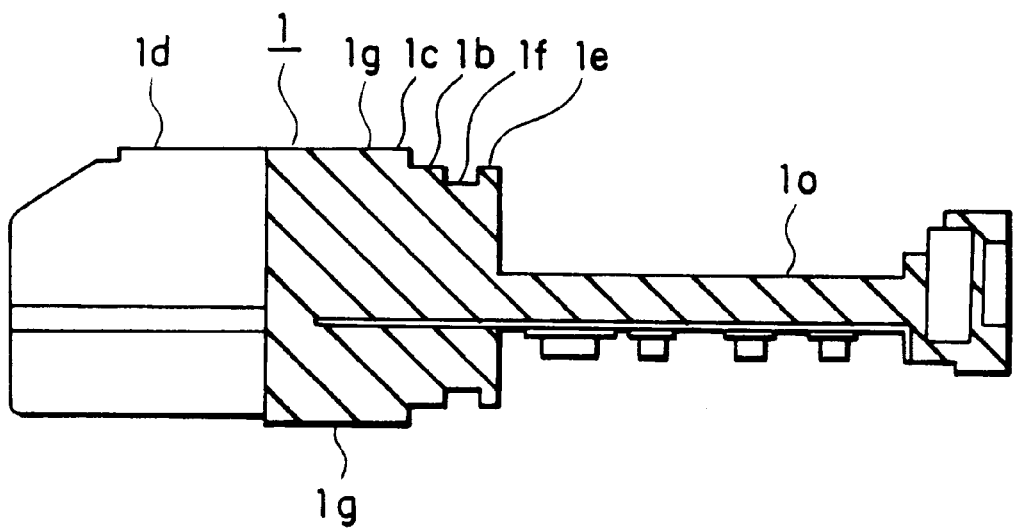
FIG. 51 is a cross-sectional view of the main sensor unit of the conventional magnetic sensor.
Figure 52:
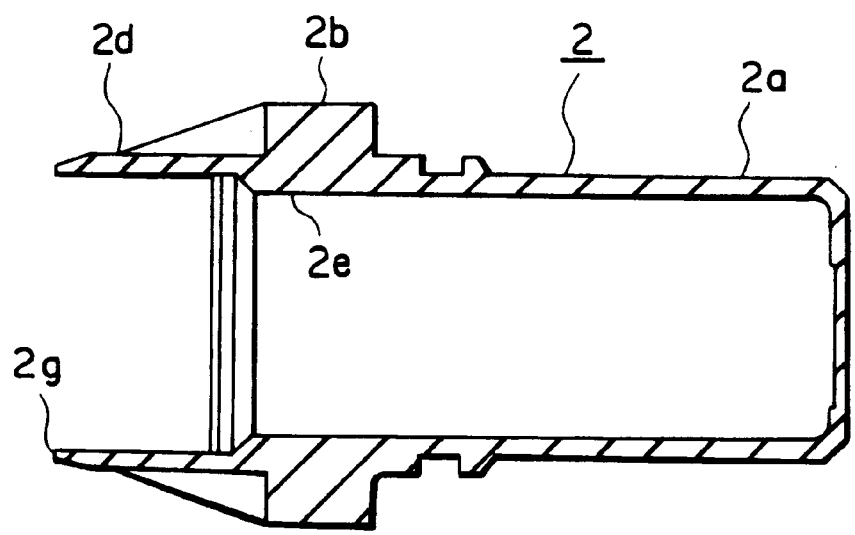
FIG. 52 is a cross-sectional view of the case of the conventional magnetic sensor.
Figure 53:
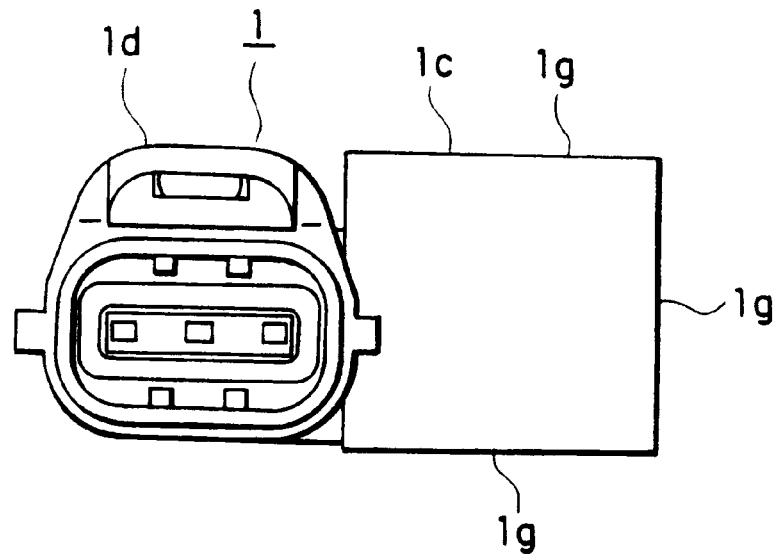
FIG. 53 is a front view of the main sensor unit of the conventional magnetic sensor.
Figure 54:
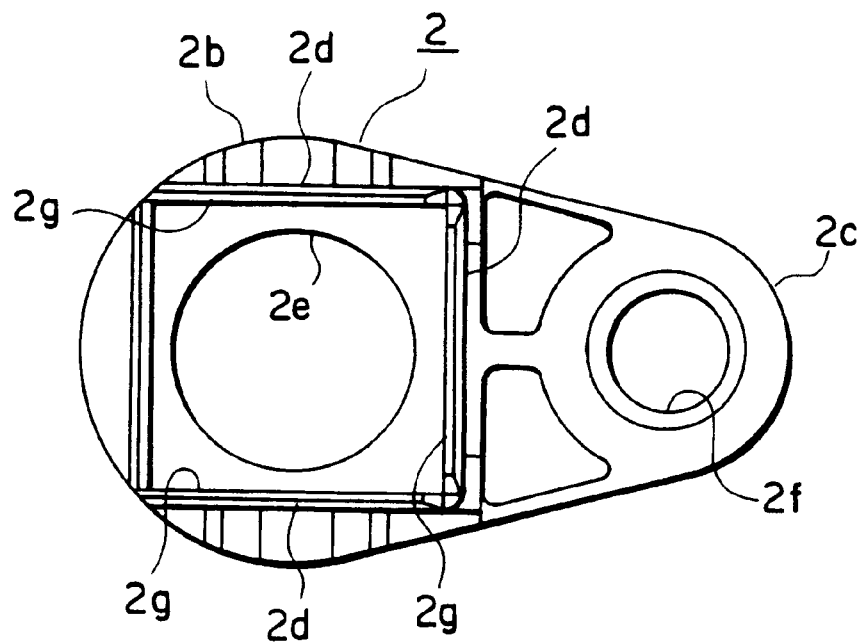
FIG. 54 is a front view of the case of the conventional magnetic sensor.

FIG. 43 is a cross-sectional view illustrating another example of the receiving structure formed on the main sensor unit of the magnetic sensor according to the present invention. FIG. 44 is a cross-sectional view illustrating a fitting structure designed to match the receiving structure of the main sensor unit shown in FIG. 43. FIG. 45 is a cross-sectional view illustrating still another example of the receiving structure formed on the main sensor unit of the magnetic sensor according to the present invention. FIG. 46 is a cross-sectional view illustrating a fitting structure designed to match the receiving structure of the main sensor unit shown in FIG. 45. FIG. 47 is a cross-sectional view illustrating still another example of the receiving structure formed on the main sensor unit of the magnetic sensor according to the present invention. FIG. 48 is a cross-sectional view illustrating a fitting structure designed to match the receiving structure of the main sensor unit shown in FIG. 47.

In the case of the main sensor unit 1 shown in FIG. 43, its intermediate part 1c is formed into the shape of a generally circular cylinder with a short length wherein a side face of the intermediate part 1c opposite to the connector 1d (not shown) is formed into the shape of a semi-circle serving as a holder receptor held by the holder of the case 2. The above side face is partially raised so as to form a receiving structure 1x extending in a direction parallel to the axis. The case 2 shown in FIG. 44 has a groove extending in a direction parallel to the axis and serving as a fitting structure 2x formed at a location corresponding to the receiving structure 1x. On the other hand, in the case of the main sensor unit 1 shown in FIG. 45, a protrusion serving as a holder receptor 1y is formed on the intermediate part 1c at a location different from that in FIG. 43. The case 2 shown in FIG. 46 has a groove serving as a fitting structure 2y formed at a location corresponding to the receiving structure 1y. In the case of the main sensor unit 1 shown in FIG. 47, a protrusion serving as a holder receptor 1z is formed on the intermediate part 1c at a still different location. The case 2 shown in FIG. 48 has a groove serving as a fitting structure 2z formed at a location corresponding to the receiving structure 1z.

In the present embodiment, various types of magnetic sensors are produced by combining various types of main sensor units 1 with various types of cases 2 which match the main sensor units 1 wherein the structure of the receiving structure and the structure of the fitting structure vary from one type magnetic sensor to another. Although it is possible to combine any type of main sensor unit 1 with a corresponding type of case 2 which matches that main sensor unit 1. It is impossible to combine any type of main sensor unit with a case that does not have a corresponding shape. Therefore, operators can easily assemble components into magnetic sensors in a correct fashion without having to pay particular attention.

In the present invention, as described above, the magnetic sensor includes: a main sensor unit including: the intermediate part in the form of a short rectangular prism, the outer surface of the intermediate part forming the holder receptor, the receiving structure being provided on a part of the holder receptor; the step-shaped seating formed on one end face of the intermediate part; the long plate shaped main part disposed at a right angle on the principal surface of the seating, the main part including: the sensor element disposed on the end of the main part, for detecting the approaching motion of a magnetic member; the permanent magnet disposed adjacent to the sensor element, for generating a magnetic field applied to the sensor element; and the electronic component electrically connected to the sensor element; and the connector extending from the intermediate part, the connector including an terminal for transmitting an output signal of the sensor element to the outside; and the case including: the sleeve in the form of a cylinder with a closed end and an open end, the sleeve having sealing means formed on the open end, the sealing means serving to create a sealed space inside the sleeve in cooperation with the seating, the sealed space serving as a space in which the main part is placed; and the holder for holding the holder receptor, the holder including the fitting structure extending from the open end of the sleeve, the fitting structure being fitted to the receiving structure and a separation stopper for preventing the main part from moving off from the sleeve.

In this magnetic sensor, since the receiving structure 2h is formed independently of the sealing means, at a location different from the location of the sealing means, it is possible to freely design the structure of the fitting structure. For example, the fitting structure can be realized by a recess, projection, or hole formed at a properly selected location. Thus a wide variety of structures are allowed for the fitting structure. Therefore, operators can easily assemble components into a magnetic sensor in a correct fashion without having to pay particular attention.

Preferably, in the magnetic sensor according to the invention, the holder is formed in such a manner as to extend from the opening of the sleeve into an outward direction in parallel to the axis of the sleeve so that the holder partially surrounds the intermediate part along its circumference; the holder is made up of a plate whose inner-side surface is in close contact with the holder receptor; the upper end portion of the plate is bent by means of high-temperature caulking so that the bent portion serves as the separation stopper; the fitting structure is formed on the inner-side surface of the plate; and the connector is formed in such a manner as to extend outward through the opening of the plate in a direction perpendicular to the axis of the sleeve. With this arrangement, it is allowed to form the separation stopper into a simple structure. This makes it easy to perform high-temperature caulking process.

What is claimed is:

1. A magnetic sensor unit comprising:
   a main sensor unit having
   (a) an intermediate part in the form of a short rectangular prism, the outer surface of said intermediate part forming a holder receptor, a receiving structure being provided on a part of said holder receptor, said receiving structure having an exterior specific shape that corresponds to a specific type of a magnetic sensor to insure that the proper magnetic sensor is inserted into the proper receiving structure, said exterior specific shape of the receiving structure being substantially rectangular where an edge portion of said rectangular receiving structure is cut off at an angle,
   (b) a step-shaped seating formed on one end face of said intermediate part,
   (c) a long plate shaped main part disposed at a right angle on the principal surface of said seating, said main part including,
      (i) a sensor element disposed on the end of said main part, for detecting the approaching motion of a magnetic member,
      (ii) a permanent magnet disposed adjacent to said sensor element for generating a magnetic field applied to said sensor element, and
      (iii) an electronic component electrically connected to said sensor element, and
   (d) a connector extending from said intermediate part, said connector including a terminal for transmitting an output signal of said sensor element to the outside; and
   a case having
   (a) a sleeve in the form of a cylinder with a closed end and an open end, said sleeve having sealing means formed on the open end, said sealing means serving to create a sealed space inside said sleeve in cooperation with said seating, said sealed space serving as a space in which said main part is placed, and
   (b) a holder for holding said holder receptor, said holder including a fitting structure having a wall structure conforming to said exterior specific shape extending from the open end of said sleeve, and a separation stopper for preventing said main part from moving off from said sleeve wherein the combination of said receiving structure having an exterior specific shape combined with a fitting structure having a wall structure conforming to said exterior specific shape extending from the open end of said sleeve dictates the combination of said receiving structure with said specific type of magnetic sensor.

2. A magnetic sensor unit according to claim 1 wherein said angle is 45°.

3. A magnetic sensor unit comprising:
   a main sensor unit having
   (a) an intermediate part in the form of a short rectangular prism, the outer surface of said intermediate part forming a holder receptor, a receiving structure being provided on a part of said holder receptor, said receiving structure having an exterior specific shape that corresponds to a specific type of a magnetic sensor to insure that the proper magnetic sensor is inserted into the proper receiving structure, said exterior specific shape of the receiving structure being substantially rectangular where an edge portion of said rectangular receiving portion is arcuated,
   (b) a step-shaped seating formed on one end face of said intermediate part,
   (c) a long plate shaped main part disposed at a right angle on the principal surface of said seating, said main part including,
      (i) a sensor element disposed on the end of said main part, for detecting the approaching motion of a magnetic member,
      (ii) a permanent magnet disposed adjacent to said sensor element for generating a magnetic field applied to said sensor element, and
      (iii) an electronic component electrically connected to said sensor element, and
   (d) a connector extending from said intermediate part, said connector including a terminal for transmitting an output signal of said sensor element to the outside; and a case having
  (a) a sleeve in the form of a cylinder with a closed end and an open end, said sleeve having sealing means formed on the open end, said sealing means serving to create a sealed space inside said sleeve in cooperation with said seating, said sealed space serving as a space in which said main part is placed, and
  (b) a holder for holding said holder receptor, said holder including a fitting structure having a wall structure conforming to said exterior specific shape extending from the open end of said sleeve, and a separation stopper for preventing said main part from moving off from said sleeve wherein the combination of said receiving structure having an exterior specific shape combined with a fitting structure having a wall structure conforming to said exterior specific shape extending from the open end of said sleeve dictates the combination of said receiving structure with said specific type of magnetic sensor.

4. A magnetic sensor unit comprising:
a main sensor unit having
  (a) an intermediate part in the form of a short rectangular prism, the outer surface of said intermediate part forming a holder receptor, a receiving structure being provided on a part of said holder receptor, said receiving structure having an exterior specific shape that corresponds to a specific type of a magnetic sensor to insure that the proper magnetic sensor is inserted into the proper receiving structure, said exterior specific shape of the receiving structure is substantially rectangular with a side portion of said rectangular receiving portion being notched,
  (b) a step-shaped seating formed on one end face of said intermediate part,
  (c) a long plate shaped main part disposed at a right angle on the principal surface of said seating, said main part including,
    (i) a sensor element disposed on the end of said main part, for detecting the approaching motion of a magnetic member,
    (ii) a permanent magnet disposed adjacent to said sensor element for generating a magnetic field applied to said sensor element, and
    (iii) an electronic component electrically connected to said sensor element, and
  (d) a connector extending from said intermediate part, said connector including a terminal for transmitting an output signal of said sensor element to the outside; and
a case having
  (a) a sleeve in the form of a cylinder with a closed end and an open end, said sleeve having sealing means formed on the open end, said sealing means serving to create a sealed space inside said sleeve in cooperation with said seating, said sealed space serving as a space in which said main part is placed, and
  (b) a holder for holding said holder receptor, said holder including a fitting structure having a wall structure conforming to said exterior specific shape extending from the open end of said sleeve, and a separation stopper for preventing said main part from moving off from said sleeve wherein the combination of said receiving structure having an exterior specific shape combined with a fitting structure having a wall structure conforming to said exterior specific shape extending from the open end of said sleeve dictates the combination of said receiving structure with said specific type of magnetic sensor.

5. A magnetic sensor unit comprising:
a main sensor unit having
  (a) an intermediate part in the form of a short rectangular prism, the outer surface of said intermediate part forming a holder receptor, a receiving structure being provided on a part of said holder receptor, said receiving structure having an exterior specific shape that corresponds to a specific type of a magnetic sensor to insure that the proper magnetic sensor is inserted into the proper receiving structure, said exterior specific shape of the receiving structure is substantially circular with a portion of said substantially circular receiving portion having a flat surface,
  (b) a step-shaped seating formed on one end face of said intermediate part,
  (c) a long plate shaped main part disposed at a right angle on the principal surface of said seating, said main part including,
    (i) a sensor element disposed on the end of said main part, for detecting the approaching motion of a magnetic member,
    (ii) a permanent magnet disposed adjacent to said sensor element for generating a magnetic field applied to said sensor element, and
    (iii) an electronic component electrically connected to said sensor element, and
  (d) a connector extending from said intermediate part, said connector including a terminal for transmitting an output signal of said sensor element to the outside; and
a case having
  (a) a sleeve in the form of a cylinder with a closed end and an open end, said sleeve having sealing means formed on the open end, said sealing means serving to create a sealed space inside said sleeve in cooperation with said seating, said sealed space serving as a space in which said main part is placed, and
  (b) a holder for holding said holder receptor, said holder including a fitting structure having a wall structure conforming to said exterior specific shape extending from the open end of said sleeve, and a separation stopper for preventing said main part from moving off from said sleeve wherein the combination of said receiving structure having an exterior specific shape combined with a fitting structure having a wall structure conforming to said exterior specific shape extending from the open end of said sleeve dictates the combination of said receiving structure with said specific type of magnetic sensor.

6. A magnetic sensor unit comprising:
a main sensor unit having
  (a) an intermediate part in the form of a short rectangular prism, the outer surface of said intermediate part forming a holder receptor, a receiving structure being provided on a part of said holder receptor, said receiving structure having an exterior specific shape that corresponds to a specific type of a magnetic sensor to insure that the proper magnetic sensor is inserted into the proper receiving structure, said exterior specific shape of the receiving structure is substantially circular with a portion of said substantially circular receiving portion having a notch,
  (b) a step-shaped seating formed on one end face of said intermediate part,
  (c) a long plate shaped main part disposed at a right angle on the principal surface of said seating, said main part including, (i) a sensor element disposed on the end of said main part, for detecting the approaching motion of a magnetic member, (ii) a permanent magnet disposed adjacent to said sensor element for generating a magnetic field applied to said sensor element, and (iii) an electronic component electrically connected to said sensor element, and (d) a connector extending from said intermediate part, said connector including a terminal for transmitting an output signal of said sensor element to the outside; and a case having (a) a sleeve in the form of a cylinder with a closed end and an open end, said sleeve having sealing means formed on the open end, said sealing means serving to create a sealed space inside said sleeve in cooperation with said seating, said sealed space serving as a space in which said main part is placed, and (b) a holder for holding said holder receptor, said holder including a fitting structure having a wall structure conforming to said exterior specific shape extending from the open end of said sleeve, and a separation stopper for preventing said main part from moving off from said sleeve wherein the combination of said receiving structure having an exterior specific shape combined with a fitting structure having a wall structure conforming to said exterior specific shape extending from the open end of said sleeve dictates the combination of said receiving structure with said specific type of magnetic sensor.

7. A magnetic sensor unit comprising:

a main sensor unit having (a) an intermediate part in the form of a short rectangular prism, the outer surface of said intermediate part forming a holder receptor, a receiving structure being provided on a part of said holder receptor, said receiving structure having an exterior specific shape that corresponds to a specific type of a magnetic sensor to insure that the proper magnetic sensor is inserted into the proper receiving structure, said exterior specific shape of the receiving structure is substantially circular with a portion of said substantially circular receiving structure having a protrusion, (b) a step-shaped seating formed on one end face of said intermediate part, (c) a long plate shaped main part disposed at a right angle on the principal surface of said seating, said main part including, (i) a sensor element disposed on the end of said main part, for detecting the approaching motion of a magnetic member, (ii) a permanent magnet disposed adjacent to said sensor element for generating a magnetic field applied to said sensor element, and (iii) an electronic component electrically connected to said sensor element, and (d) a connector extending from said intermediate part, said connector including a terminal for transmitting an output signal of said sensor element to the outside; and a case having (a) a sleeve in the form of a cylinder with a closed end and an open end, said sleeve having sealing means formed on the open end, said sealing means serving to create a sealed space inside said sleeve in cooperation with said seating, said sealed space serving as a space in which said main part is placed, and (b) a holder for holding said holder receptor, said holder including a fitting structure having a wall structure conforming to said exterior specific shape extending from the open end of said sleeve, and a separation stopper for preventing said main part from moving off from said sleeve wherein the combination of said receiving structure having an exterior specific shape combined with a fitting structure having a wall structure conforming to said exterior specific shape extending from the open end of said sleeve dictates the combination of said receiving structure with said specific type of magnetic sensor.

* * * * *